(12) United States Patent
Badescu et al.

(10) Patent No.: US 10,508,513 B2
(45) Date of Patent: Dec. 17, 2019

(54) HIGH PRESSURE HIGH FLOW DIGITAL VALVE WITH LOCKING POPPETS AND BACKFLOW PREVENTION

(71) Applicant: CALIFORNIA INSTITUTE OF TECHNOLOGY, Pasadena, CA (US)

(72) Inventors: Mircea Badescu, La Canada Flintridge, CA (US); Stewart Sherrit, La Crescenta, CA (US); Xiaoqi Bao, San Gabriel, CA (US); Yoseph Bar-Cohen, Seal Beach, CA (US); Jeffery L. Hall, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 378 days.

(21) Appl. No.: 15/486,221

(22) Filed: Apr. 12, 2017

(65) Prior Publication Data

US 2017/0298709 A1    Oct. 19, 2017

Related U.S. Application Data

(60) Provisional application No. 62/322,143, filed on Apr. 13, 2016.

(51) Int. Cl.
*E21B 34/14* (2006.01)
*F16K 1/12* (2006.01)

(52) U.S. Cl.
CPC .............. *E21B 34/14* (2013.01); *F16K 1/12* (2013.01)

(58) Field of Classification Search
CPC ...................................................... E21B 34/14
See application file for complete search history.

(56) References Cited

U.S. PATENT DOCUMENTS

| | | |
|---|---|---|
| 5,176,164 A | 1/1993 | Boyle et al. |
| 6,860,330 B2 | 3/2005 | Jackson et al. |
| 7,942,206 B2 | 5/2011 | Huang et al. |
| 9,945,207 B2 | 4/2018 | Bao et al. |
| 2010/0090149 A1 | 4/2010 | Thompson et al. |

(Continued)

OTHER PUBLICATIONS

Badescu, M., et al., "Digital valve for high pressure high flow applications." *SPIE Proceedings 9801, Industrial and Commercial Applications of Smart Structures Technologies 2016, 98010B* (Apr. 2016). 10 pages.

(Continued)

*Primary Examiner* — Kristyn A Hall
(74) *Attorney, Agent, or Firm* — Steinfl + Bruno LLP

(57) ABSTRACT

A valve that allows control of each of one or more flow paths using one actuator is presented. Rotary motion of a motor is transformed into linear motion using a roller screw mechanism. The travel of the roller screw nut is predefined between front and back hard stops that prevent the roller screw from rotating when the stops are reached. A poppet is attached to the nut using a flexible connection. The nut drives a sleeve with inclined surfaces that moves relative to a locking flexure. When the sleeve is driven, it deforms flanges of the locking flexure causing a cantilever end finger of the flexure to move radially and prevent the poppet from being pushed back. If the sleeve is moved farther, a groove on the sleeve engages notches on the fingers creating a detent that prevents the spring to push the sleeve back.

21 Claims, 14 Drawing Sheets

(56) References Cited

U.S. PATENT DOCUMENTS

| | | | |
|---|---|---|---|
| 2011/0042104 A1* | 2/2011 | Xu | E21B 23/01 |
| | | | 166/382 |
| 2014/0224342 A1* | 8/2014 | Bao | E21B 34/10 |
| | | | 137/10 |
| 2014/0312739 A1 | 10/2014 | Bar-Cohen et al. | |

OTHER PUBLICATIONS

Accessed the Bournoulli Equation on Apr. 30, 2016 with University of Chicago via http://geosci.uchicago.edu/~moyer/GEOS24705/Notes/Bernoulli.pdf. 3 pages.

Accessed the meaning of plurality with the free dictionary on Apr. 29, 2016 via http://www.thefreedictionary.com/. 3 pages.

Darcy's Law definition. Accessed on Sep. 15, 2016 via https://bae.okstate.edu/faculty-sites/Darcy/LaLoi/Basics.htm. 6 pages.

Final Office Action for U.S. Appl. No. 14/174,575, filed Feb. 6, 2015 on behalf of California Institute of Technology, dated Nov. 1, 2017. 33 pages.

Final Office Action for U.S. Appl. No. 14/174,575, filed Feb. 6, 2015 on behalf of California Institute of Technology, dated Sep. 20, 2016. 23 pages.

Haugen K., et al., "Sand erosion of wear-resistant materials: Erosion in choke valves", Wear 186-187, pp. 179-188, (1995).

Non-Final Office Action for U.S. Appl. No. 14/174,575, filed Feb. 6, 2015 on behalf of California Institute of Technology, dated Mar. 29, 2017. 28 pages.

Non-Final Office Action for U.S. Appl. No. 14/174,575, filed Feb. 6, 2015 on behalf of California Institute of Technology, dated May 5, 2016. 18 pages.

Notice of Allowance for U.S. Appl. No. 14/174,575, filed Feb. 6, 2015 on behalf of California Institute of Technology, dated Feb. 14, 2018. 5 pages.

\* cited by examiner

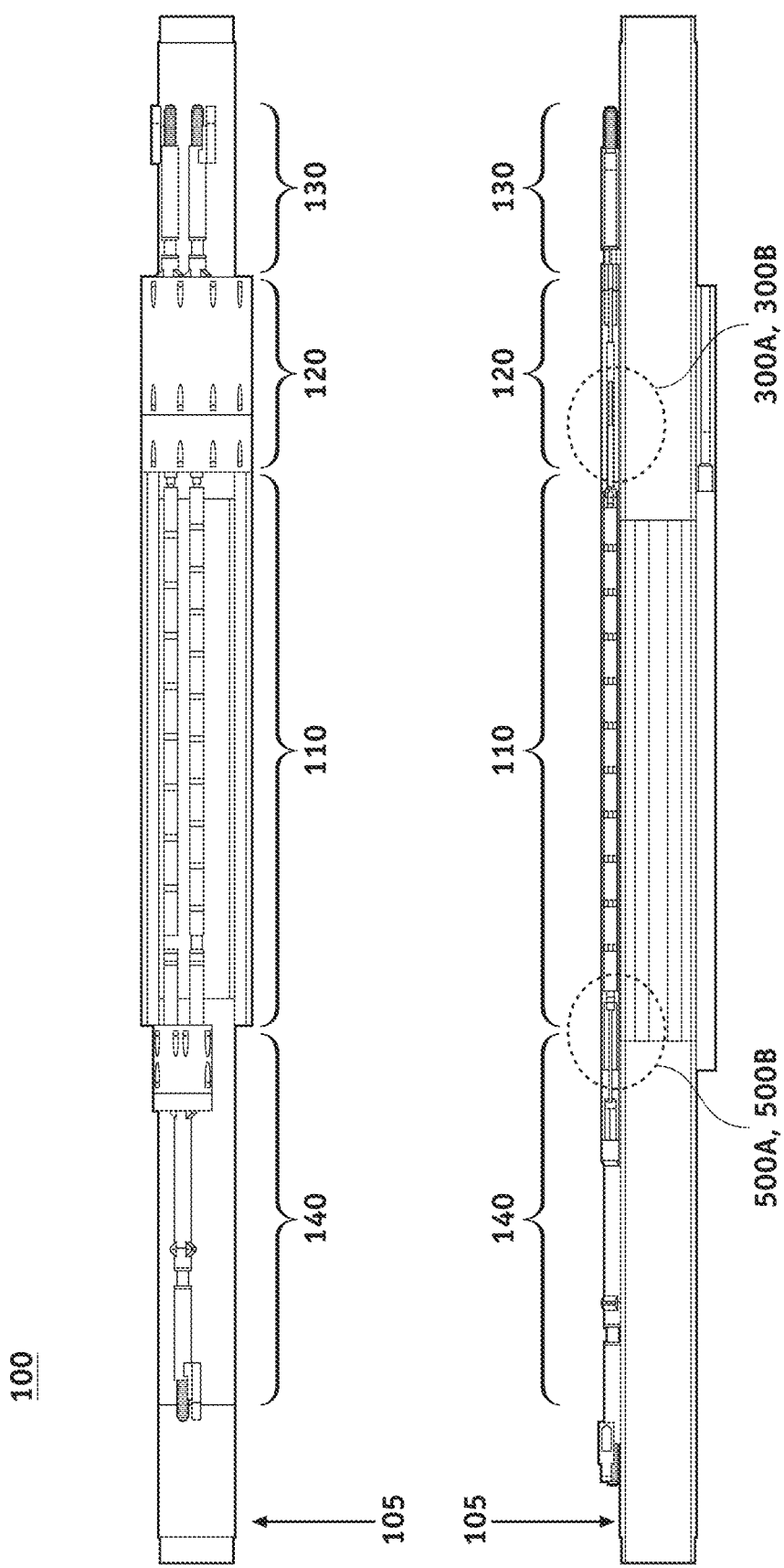

HIGH PRESSURE HIGH FLOW DIGITAL VALVE WITH LOCKING POPPETS AND BACKFLOW PREVENTION

CROSS REFERENCE TO RELATED APPLICATIONS

The present application claims priority to and the benefit of co-pending U.S. provisional patent application Ser. No. 62/322,143 entitled "High Pressure High Flow Digital Valve with Locking Poppets and Backflow Prevention", filed on Apr. 13, 2016, which application is incorporated herein by reference in its entirety.

The present application is related to U.S. patent application Ser. No. 14/174,575 entitled "Multi-Path Multi-Stage Erosion-Resistant Valve for Downhole Flow Control" filed on Feb. 6, 2014, which application is incorporated herein by reference in its entirety.

STATEMENT OF GOVERNMENT GRANT

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to systems and methods for control of fluid flow in general, and particularly to systems and methods for controlling the flow of fluids in oil production design where mitigation of back flow of fluids due to pressure differential is desired.

BACKGROUND

Choke valves for use in the downhole environment of oil wells are well known. However, it is difficult to design and construct choke valves that fit within the restricted available space, that operate using limited power and that have long operational lifetimes. These choke valves must control the flow rate from high pressure oil reservoirs in the presence of fluids that contain abrasive particulate material such as sand, possibly in significant concentrations.

The above referenced U.S. patent application Ser. No. 14/174,575, whose disclosure is incorporated herein by reference in its entirety, describes a flow control valve that operates in a high-pressure environment to provide a controlled flow rate, while using limited power and limited space, and providing a long operational lifetime. Such flow control valve consists of a digitalized flow control valve with multipath and multistage pressure reduction structures. Specifically, the valve is configured as a set of parallel flow paths from an inlet (e.g. open to a formation containing a fluid) to an outlet. A choke valve controls the total flow rate by digitally opening different paths or different combination of the paths. Each path is controlled by a poppet cap valve that is basically operated in ON-OFF states. The number of flow states can therefore be up to $2^N$ (2 to the power N), where N is the number of flow paths. In an exemplary non-limiting case where N=2 and two poppets p1, p2 are used to control flow of the two paths, $2^2$=4 flow states are available, defined by the following configuration of the two poppets: (p1, p2)={(ON, ON), (ON, OFF), (OFF, ON), (OFF, OFF)}. To avoid erosion from sand in the fluid and high speed flow, the seal area of the poppet cap valve is located at a distance from the flow inlet away from the high speed flow and the speed is controlled to stay below a predefined erosion safe limit. Each flow path is a multistage structure composed of a set of serial nozzles-expansion chambers that equally distribute the total pressure drop to each stage. The pressure drop of each stage and, therefore, the flow speed at the nozzles and expansion chambers is controlled by the number of stages of the multistage structure. The flow paths have a relatively small cross section and could be relatively long for large number of stages and still fit in a strict annular space limit.

A choke valve, such as one described above, may be subject to positive or negative high pressure differential between its inlet and outlet ports which in turn can contribute to an undesired backflow of the fluid from the outlet of the choke valve to the inlet. There is a need for improved valves for control of flow in oil production to prevent such undesired backflow while maintaining the mentioned choke valve design goals.

SUMMARY

Teaching according to the present embodiments provide a backflow control unit that when interfaced with one or more flow paths of a flow control valve, can open and close an opening to the one or more flow paths to control/prevent a backflow. As described below, this can be accomplished using a single actuator that can control one or more poppet valves to open and close opening to corresponding one or more flow paths. A poppet locking mechanism locks the poppet valves in their open and closed states to prevent backflow using a novel locking flexure and mating locking sleeve.

According to one embodiment the present disclosure, a flow control valve is presented, the flow control valve comprising: one or more parallel flow paths; one or more poppets configured to operate in one of a fully open state and a fully closed state to control flow of fluid through the one or more parallel flow paths; and a backflow prevention mechanism comprising: a linear actuator configured to control operating states of the one or more poppets through motion of the one or more poppets according to an axial direction; and a locking mechanism configured to lock the one or more poppets in the fully closed state and maintain the one or more poppets in their closed state against a back pressure of the backflow in the one or more parallel flow paths, wherein the locking mechanism comprises: a locking sleeve rigidly coupled to the linear actuator; and a locking flexure configured to flex responsive to a surface interaction with the locking sleeve, wherein in the fully closed state, the locking sleeve is fully inserted within the locking flexure and a resulting surface interaction causes a flexing of the locking flexure to create a mechanical interference against movement of the one or more poppets in the axial direction, and wherein retraction of the locking sleeve from a fully inserted position progressively reduces the flexing of the locking flexure to clear the mechanical interference.

According to a second embodiment of the present disclosure, a locking mechanism is presented, the locking mechanism comprising: a locking sleeve comprising a substantially cylindrical contact surface that is constrained at a base by a locking sleeve base, the cylindrical contact surface defining an axial direction; and a locking flexure comprising: a locking flexure base of a substantially circular shape with a hollow body configured to clear the cylindrical contact surface of the locking sleeve; and a plurality of locking flexure fingers constrained at their base by the locking flexure base, each of the plurality of the locking flexure fingers comprising: i) a finger flexible section having flexible contact surfaces configured to interact with the cylindrical contact surface; and ii) a finger free end formed at a distal end of the each finger from the locking flexure base, the finger free end comprising a hinge to constrain rotation of the finger free end about an axis of the hinge that is substantially perpendicular to the axial direction of the cylindrical contact surface; wherein for each of the locking flexure fingers, interaction of the contact surfaces provided by progressive insertion of the locking sleeve into the locking flexure, progressively flexes the finger flexible section to cause progressive rotation of the finger free end about the axis of the hinge.

According to a third embodiment of the present disclosure, a method for backflow prevention in a valve comprising one or more parallel flow paths is presented, the method comprising: providing one or more poppets to control fluid flow of the one or more parallel flow paths, the one or more poppets configured to operate according to operating states comprising a fully open state and a fully closed state; and controlling, through a linear actuator, the operating states of the one or more poppets through motion of the one or more poppets according to an axial direction; wherein controlling for closing of the one or more poppets comprises: i) progressively moving a locking sleeve rigidly coupled to the linear actuator into a locking flexure; ii) based on the progressively moving, progressively compressing a spring coupled between the one or more poppets and the linear actuator, thereby moving said poppets; iii) based on the progressively moving, creating a surface interaction between the locking sleeve and the locking flexure; iv) based on the creating, flexing the locking flexure while clearing a stop nut rigidly coupled to the one or more poppets; v) repeating steps i) through iii); and vi) based on the repeating, reaching the fully closed state and further flexing the locking flexure to create an interference between the locking flexure and the stop nut, thereby locking the one or more poppets.

Further aspects of the disclosure are shown in the specification, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 1 illustrates an exemplary implementation according to the present disclosure of a choke valve (100) comprising a plurality of parallel flow paths (110) with a backflow prevention mechanism. Overall design of the choke valve (100) and its components are shown in the top portion of the figure, while a cross section of the choke valve (100) is shown in the bottom portion of the figure. In such exemplary implementation, according to the present disclosure, backflow control is provided via a backflow actuator (140) operating on outlets of the plurality of flow paths (110) by closing poppets to cap the outlets and locking the poppets in their closed position. Further backflow control is provided via an integrated poppets section (120) coupled to motors (130) that independently control opening and closing of inlets of the plurality of flow paths (110) via poppets of the integrated poppets section (120) that are locked in their closed position. Poppets operating on inlets and outlets of the flow paths (110) can be locked in their open and closed positions. Locking of the poppets is provided by a locking mechanism with details shown in FIGS. 3-5 (later described). Although the exemplary embodiment depicted in FIG. 1 comprises backflow control for both the inlets and the outlets of the plurality of flow paths (110), one such backflow control operating on one of the inlets or the outlets may be sufficient.

DETAILED DESCRIPTION

Figure 2A:
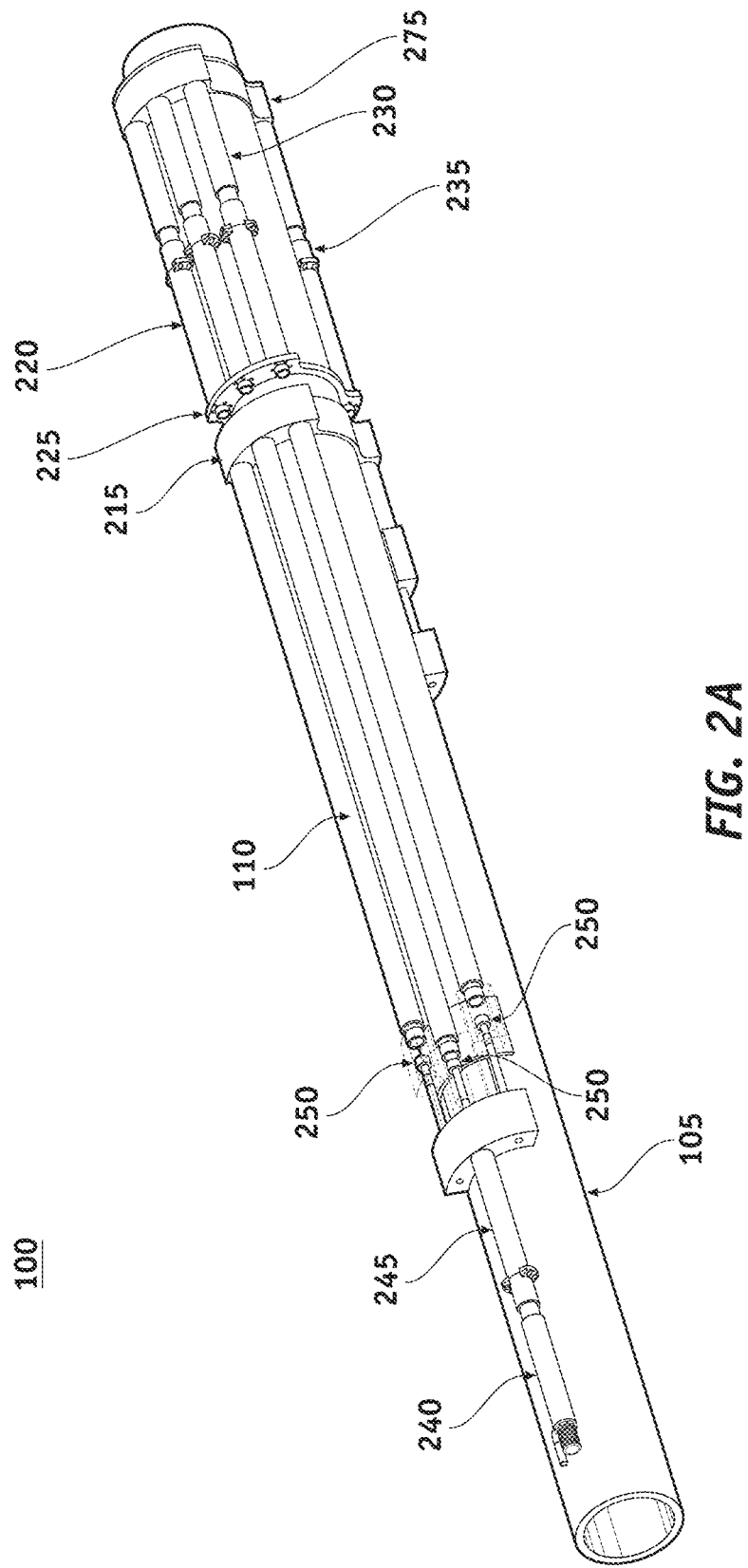
FIG. 2A illustrates a top isometric view of the choke valve (100) depicted in FIG. 1 excluding an outer ruggedization layer (e.g. outer pipe) so as to expose sections of the choke valve (100) for clarity reasons. This view shows three flow paths (110) of varying lengths which may be coupled, at their inlets, to corresponding poppets end caps (225) with independent actuation via motors (230), and which may be coupled, at their outlets, to corresponding poppets end caps (250) with single actuation via motor (240). Translation of the poppets end caps (225, 250) for capping/uncapping of the inlets/outlets is provided via roller screw mechanisms (220, 245) that translate rotary motion of motors (230, 240) to linear motion. Flow of fluid is from the inlets of the flow paths (110), positioned in a region of the face plate (215), which are exposed to, for example, a formation containing the fluid, to the outlets of the flow paths (110) that route the fluid to the inner pipe (105).

FIG. 1 illustrates an exemplary implementation according to the present disclosure of a choke valve (100) comprising a plurality of parallel flow paths (110) with a backflow prevention mechanism. Overall design of the choke valve (100) and its components are shown in the top portion of the figure, while a cross section of the choke valve (100) is shown in the bottom portion of the figure. The flow paths (110) are configured to provide a flow of fluid from a formation containing a fluid to an inner pipe (105). The fluid flows from the formation into inlets of the flow paths (110), and from outlets of the flow paths (110) into the inner pipe (105). According to one exemplary embodiment, the flow paths (110) may be digitalized flow paths to allow digital control of a flow rate of the valve (100) by digitally opening and closing different paths or different combination of paths via poppets. Furthermore, each of the flow paths (110) may comprise a plurality of series connected pressure reduction stages as described in the above referenced U.S. patent application Ser. No. 14/174,575, the disclosure of which is incorporated herein by reference in its entirety.

According to an embodiment of the present disclosure, backflow control for the choke valve (100) may be provided via a backflow actuator (140) operating on outlets of the plurality of flow paths (110) by closing poppets to cap the outlets and locking the poppets in their closed position. Further backflow control may be provided via an integrated poppets section (120) coupled to motors (130) that independently control opening and closing of inlets of the plurality of flow paths (110) via poppets of the integrated poppets section (120) that are locked in their closed position. Poppets operating on inlets and outlets of the flow paths (110) can be locked in their open and closed positions. Locking of the poppets is provided by a locking mechanism with details shown in FIGS. 3-5. Although the exemplary embodiment depicted in FIG. 1 comprises backflow control for both the inlets and the outlets of the plurality of flow paths (110), one such backflow control operating on one of the inlets or the outlets may be sufficient. Although not shown for clarity reasons in FIG. 1, components (110, 120, 130, 140) of the choke valve (100) are ruggedized by placement of such components inside of a solid thick wall pipe (e.g. outer pipe 295 of FIG. 2C).

The backflow prevention mechanism according to the present disclosure can prevent a reverse flow from the inner pipe (105) thru the flow paths (110) of the valve (100) and to the outside of the valve (e.g. outside formation) when a pressure in the inner pipe (105) at region of the outlets of the flow paths (110) is larger than a pressure of the outside formation at a region of the inlets of the flow paths (110). Such backflow prevention mechanism can also serve to protect the regions of the flow paths (110), such as for example, reduction stages, from erosion in case of extreme pressure differential. In a case where the valve (100) is not expected to be actuated against a high pressure, the backflow actuator (140) operating on the outlets of the flow paths (110) may be designed with a single motor and multiple poppets acting on the multiple flow paths (110). The flow paths (110) can be controlled in groups of two, three or more at a time, depending on the chosen implementation and expected pressure. In the exemplary configuration depicted in FIG. 1, the backflow actuator (140) controls backflow via a single motor acting on three poppets to cap and uncap outlets of the flow paths (110). Furthermore, individual motors (130) are used to control poppets of the integrated poppets section (120) to cap and uncap inlets of the flow paths (110) to independently enable/disable each of the flow paths (110) while providing added backflow protection.

FIG. 2A illustrates a top view of the choke valve (100) depicted in FIG. 1 excluding an outer ruggedization layer (e.g. outer pipe) so as to expose sections of the choke valve (100) for clarity reasons. This view shows three flow paths (110) of varying lengths which may be coupled, at their inlets, to corresponding poppets end caps (225) with independent actuation via motors (230), and which may be coupled, at their outlets, to corresponding poppets end caps (250) with single actuation via motor (240). Translation of the poppets end caps (225, 250) for capping/uncapping of the inlets/outlets is provided via roller screw mechanisms (220, 245) that translate rotary motion of motors (230, 240) to linear motion. Flow of fluid is from the inlets of the flow paths (110), positioned in a region of the face plate (215), which are exposed to, for example, a formation containing the fluid, to the outlets of the flow paths (110) that route the fluid to the inner pipe (105). It should be noted that the exemplary case of a total of six flow paths depicted in FIG. 2A should not be considered as limiting the present disclosure, as the present teachings equally apply to any number of parallel flow paths (110).

With further reference to FIG. 2A, it should be noted that although not shown in the figure, the motors sections (230, 240) may include, in addition to the motors for controlling the poppets within sections (220, 250), optional motor gearheads, bearings for guiding and constraining the shafts of the roller screws within sections (220, 245), bellows for clean enclosure volume change mitigation, and motor power connectors. As the motors are required to run in clean oil, clean enclosures are provided that individually enclose each motor with associated gearhead, bearings, roller screw, poppet locking mechanism and poppet shaft. Each such clean enclosure is sealed from fluid exchange (e.g. with fluid of a formation) and allows the poppet shaft (e.g. 330 of FIG. 3 later described) to slide in and out of the enclosure (see FIG. 3 later described). Since a length of a portion of the poppet shaft included in the clean enclosure varies depending on the location of the poppet between the open or closed position of a flow path (110), a volume of the components in the clean enclosure varies, and therefore included are bellows to mitigate this volume change. During the poppet actuation, such bellows allow for part of the oil inside the clean enclosure to migrate from one side of the enclosure to another side of the enclosure using clearances between moving parts or orifices designed in the parts when clearances are not possible to implement. The enclosure is built via cavities formed inside of a solid thick wall pipe (outer pipe) to ruggedize the sections (220, 245, 250) shown in FIG. 2A.

Figure 2B:
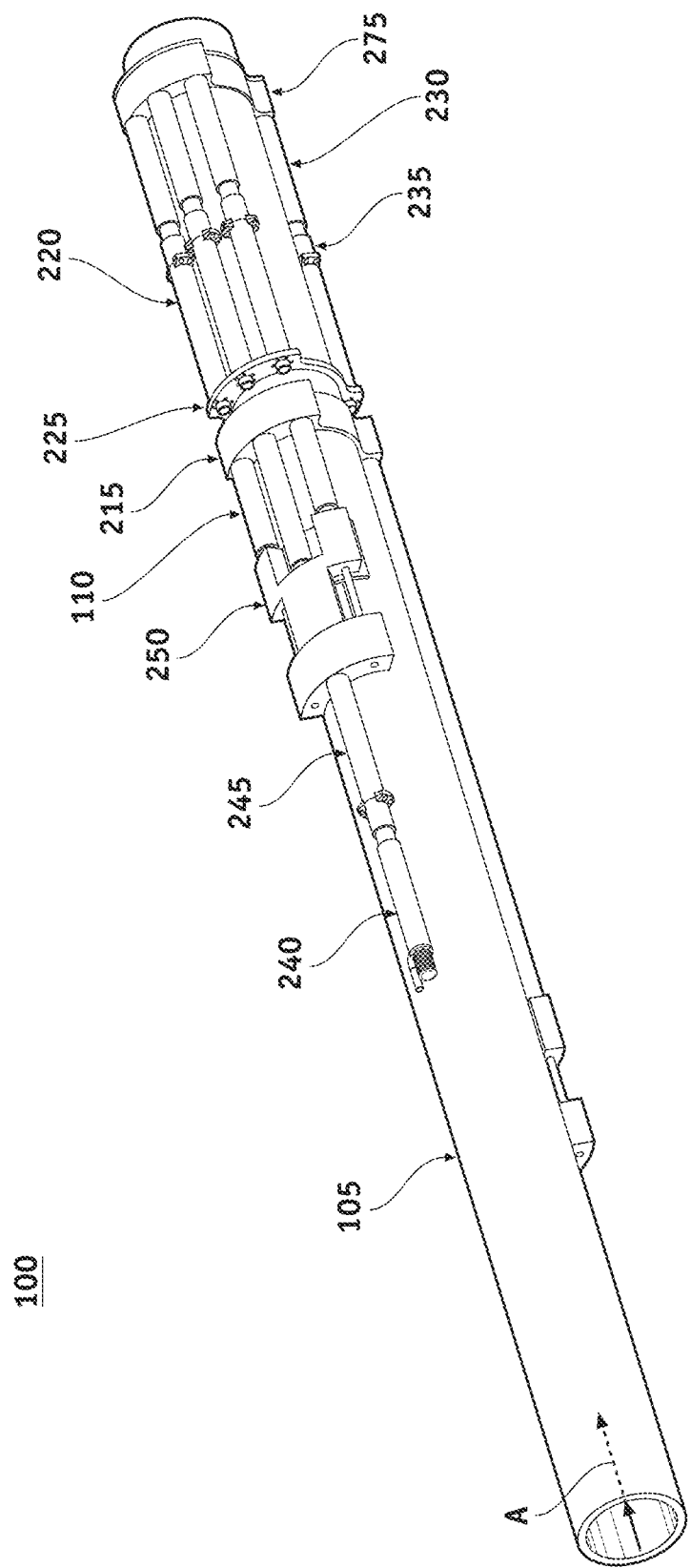
FIG. 2B illustrates a bottom isometric view of the choke valve (100) depicted in FIG. 1 excluding the outer ruggedization layer so as to expose sections of the choke valve (100) in a similar manner as provided in FIG. 2A. As can be seen in the figure, similar sections to ones provided at the top portion of the choke valve (100) depicted in FIG. 2A are provided at the bottom portion of the choke valve (100). Lengths of the flow paths (110) shown in FIG. 2B can be substantially shorter than lengths of the flow paths (110) shown in FIG. 2A, and therefore, an opening into the inner pipe (105) for flow of fluid from the outlets of the shorter length flow paths (110) of FIG. 2B may be at a different region of the inner pipe (105) when compared to a corresponding opening for flow of fluid from the outlets of the longer flow paths (110) of FIG. 2A.

FIG. 2B illustrates a bottom view of the choke valve (100) depicted in FIG. 1 excluding the outer ruggedization layer so as to expose sections of the choke valve (100) in a similar manner as provided in FIG. 2A. As can be seen in the figure, similar sections to ones provided at the top portion of the choke valve (100) depicted in FIG. 2A are provided at the bottom portion of the choke valve (100). As can be seen in the figure, lengths of the flow paths (110) can be substantially shorter than lengths of the flow paths (110) seen in FIG. 2A, and therefore, an opening into the inner pipe (105) for flow of fluid from the outlets of the shorter length flow paths (110) of FIG. 2B may be at a different region of the inner pipe (105) when compared to a corresponding opening for flow of fluid from the outlets of the longer flow paths (110) of FIG. 2A. Different lengths of the flow paths (110) may be associated to different number of series connected pressure reduction stages of the flow paths (110) as described, for example, in the above referenced U.S. patent application Ser. No. 14/174,575, the disclosure of which is incorporated herein by reference in its entirety.

Figure 2C:
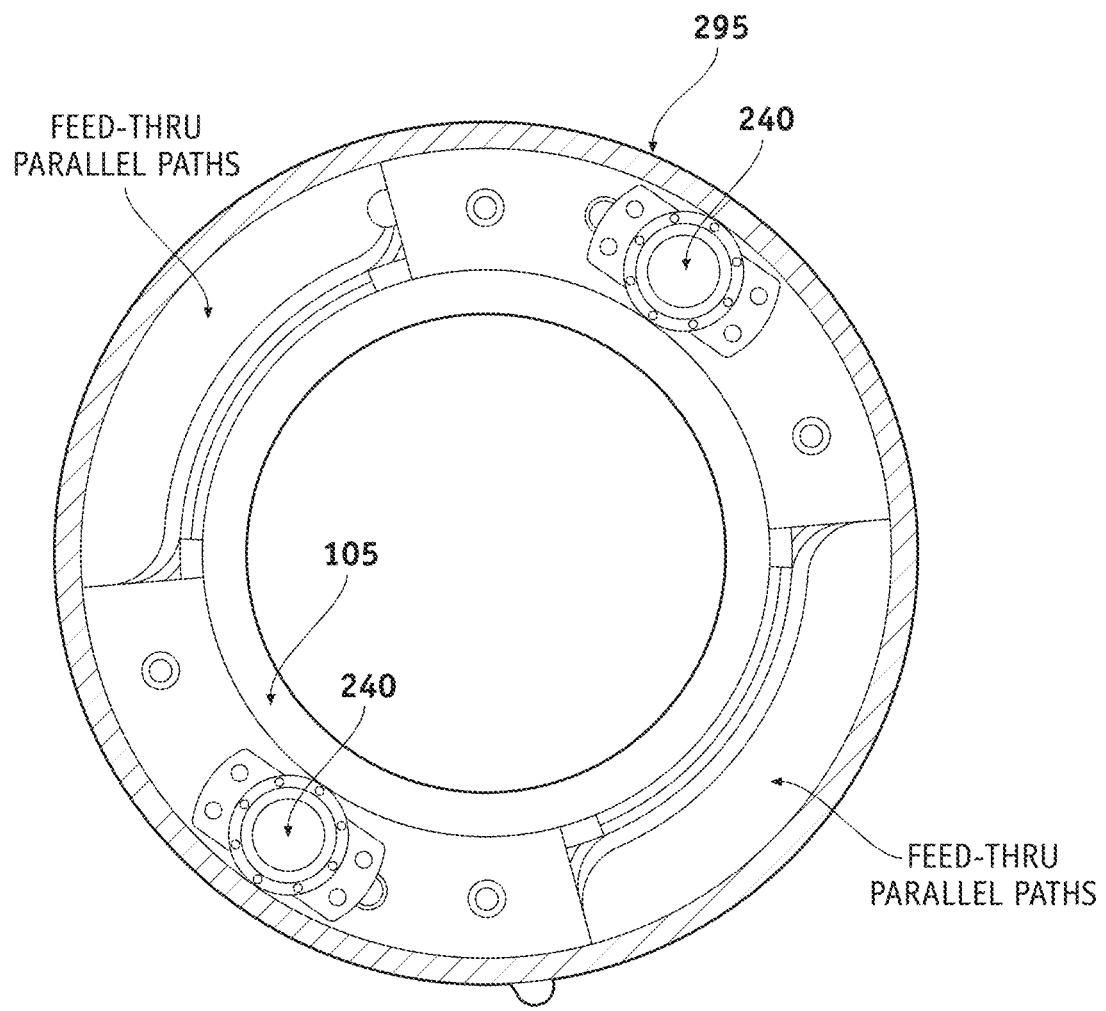
FIG. 2C illustrates a view of the choke valve (100) in the direction A shown in FIG. 2B including the ruggedization layer which, in this case, is in the form of an outer pipe (295).

FIG. 2C illustrates a view of the choke valve (100) in the direction A shown in FIG. 2B including the ruggedization layer which, in this case, is in the form of an outer pipe (295). Solid sections between the inner pipe (105) and the outer pipe (295) include cavities used to form the sealed oil filled clean enclosures that house various moving components of the choke valve (100) described above.

Figure 3:
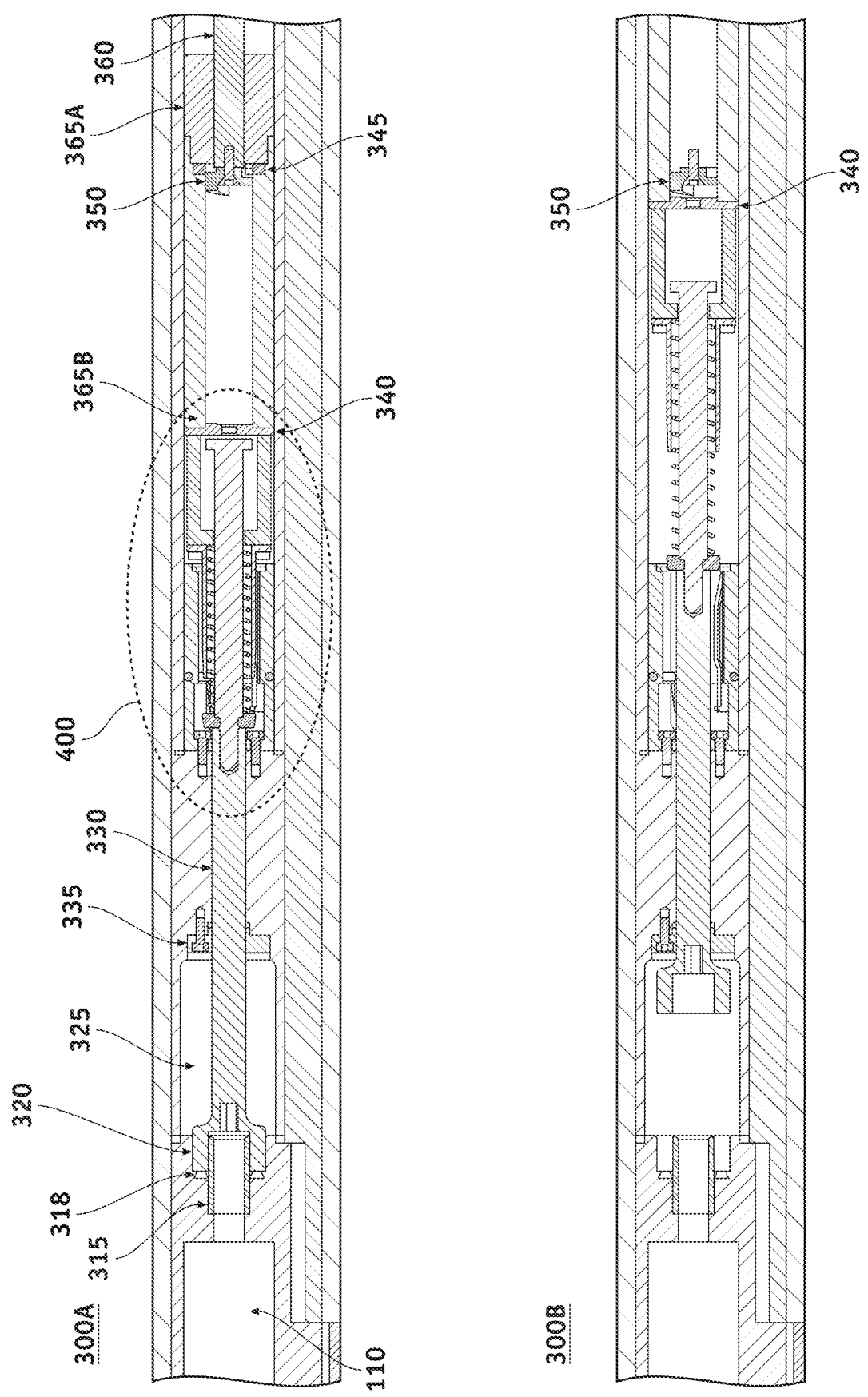
FIG. 3 shows an enlarged version of FIG. 1 in a region of cross section details 300A and 300B as related to actuation and locking of a poppet within the integrated poppet section (120). Such details comprise i) coupling of a screw (360) of a roller screw mechanism to a poppet (320, 330), ii) a linear motion range (travel range) of the poppet (320, 330), from a fully retracted position (details 300B) to a fully pushed forward position (details 300A), iii) limiting the rotation of the roller screw mechanism (220, 245) via interaction of hard stops (340, 345) mounted on a nut (365) of the roller screw and an interference (350) mounted on a screw (360) of the roller screw, the hard stops (340, 345) defining the linear motion range of the poppet (320, 330), and iv) locking mechanism (400) of the poppet (320, 330) via a locking flexure.

FIG. 3 shows an enlarged version of FIG. 1 in a region of cross section details 300A and 300B which include actuation mechanism (350, 360, 365) for actuation of the poppets (320, 330) and poppet locking mechanism (400). The top view of FIG. 3, including details 300A, shows a flow path (110) that is closed via poppet cap (320) that caps an inlet (entry nozzle 315) of the flow path (110) within a flow cage (325) region of the valve (100) that is in contact with a formation containing a fluid. The bottom view of FIG. 3, including details 300B, shows the flow path (110) that is open which therefore allows the fluid to flow from the flow cage (325) into the flow path (110) via its inlet (entry nozzle 315). A poppet shaft seal (335) provides fluidic isolation between the flow cage (325) and the actuation/locking mechanism. It should be noted that the roller screw nut (365) can be fabricated in a single extended component or can be fabricated as separate components as shown in FIG. 3 where the roller screw nut (365A) is attached (rigidly connected) to a roller screw nut extension (365B) locating the actuator/roller screw back hard stop (345).

As can be seen in FIG. 3, a rotary motion of a screw (360) of roller screw mechanism (e.g. 220, 245) coupled to a rotating motor (e.g. 230, 240) is converted to a linear motion (translation, axial motion) of a nut (365) of the roller screw mechanism. The screw (360) is kept at a fixed position through constrained linear motion and the nut (365) has constrained rotary motion. Therefore, rotation of the screw (360) causes the linear motion of the nut (365). A travel range of the linear motion is delimited by two hard stops (340, 345) mounted at two locations of the nut (365) designed to interfere with rotation of the screw (360). Interaction of a roller screw nut interference (350) mounted on a front region of the screw (360) with hard stops (340, 345) constrains rotation of the screw (360) and therefore limits the travel of the nut (365), and prevents locking of the screw (360) and the nut (365).

Details (300A) of FIG. 3 show the nut (365) at its outer travel limit position defined by the interaction of the actuator/roller screw back hard stop (345) with the roller screw nut interference (350). In this position, the poppet (320, 330) is fully pushed forward and the poppet locking mechanism (400) for backflow control is activated. Details (300B) of FIG. 3 show the nut (365) at its inner travel limit position defined by the interaction of the actuator/roller screw front hard stop (340) with the roller screw nut interference (350). In this position, the poppet (320, 330) is fully retracted and the poppet locking mechanism (400) for backflow control is deactivated. As described above, FIG. 3 shows a portion of the oil filled clean enclosure encompassing moving elements of the actuation/locking mechanism, the enclosure being formed by cavities in a ruggedized fashion.

Figure 4:
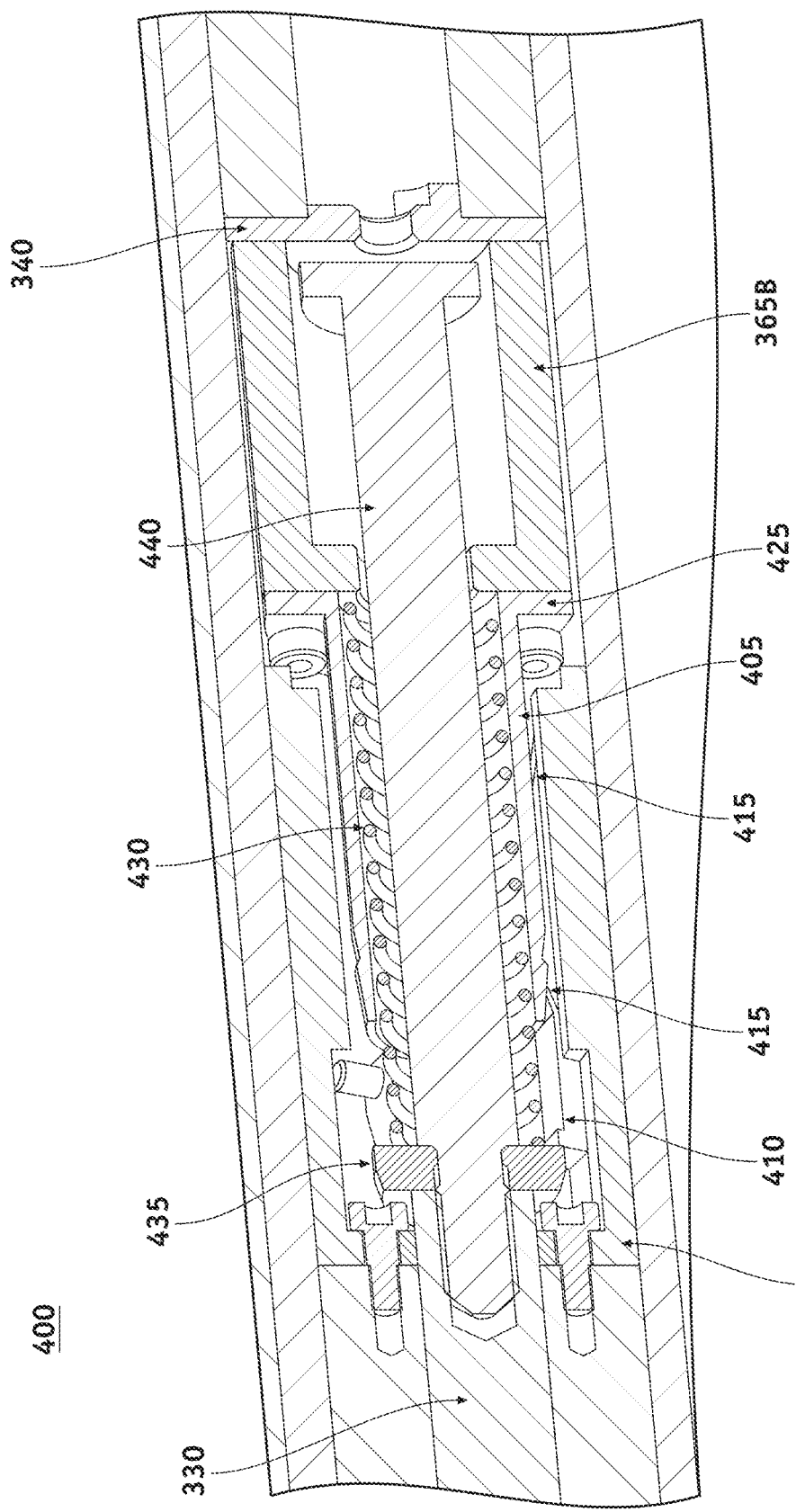
FIG. 4 shows an enlarged version of FIG. 3 in a region of details (400). Such details comprise the locking mechanism of the poppet via a combination of a locking flexure, represented by a locking flexure finger that comprises a free end (410) and a flexible section (415), and a mating locking sleeve (405). Interaction between a surface of the locking sleeve (405) and the locking flexure finger flexible section (415) bends (flexes) the locking flexure finger flexible section (415) which in turn creates a displacement of the free cantilevered end of the locking flexure finger free end (410) in a direction to interfere with a poppet stop nut (435) that is rigidly coupled to a poppet shaft (330), thereby blocking the poppet (320, 330) from retracting.

FIG. 4 shows an enlarged version of FIG. 3 in a region of details (400). Such details comprise the locking mechanism (400) of the poppet. The locking mechanism (400) according to the present disclosure is a flexible axial connection where the poppet shaft (330) and the nut (365) compress a spring (430). A combination of a locking flexure, represented by a locking flexure finger of a plurality of locking flexure fingers, each having a locking flexure free end (410) and a locking flexure finger flexible section (415), and a mating locking sleeve (405) provide the main locking functionality. The locking sleeve (405) is rigidly attached to the nut (365) so that translation of the nut (365) controls relative position of the locking sleeve (405) with respect to the locking flexure (410, 415), the locking flexure being fixed within a locking flexure housing (420). Interaction between a surface of the locking sleeve (405) and the locking flexure finger flexible section (415) bends (flexes) the locking flexure finger flexible section (415) which in turn creates a displacement of the free cantilevered end of the locking flexure finger free end (410) in a direction to interfere with a poppet stop nut (435), thereby blocking the poppet (330) from retracting. As can be seen in FIG. 4, the poppet stop nut (435) is rigidly coupled to the poppet shaft (330) via the poppet peg (440).

When the flow path (110) is open, as shown in details (300B) of FIG. 3, the poppet (320, 330) is fully retracted and the poppet spring (430) is expanded. The locking sleeve (405) is not acting on the flexure (410, 415) and therefore the flexure finger free end (410) clears the poppet stop nut (435).

With reference to FIGS. 3 and 4, closing of the poppet (320, 330) comprises i) moving of the nut (365) and the locking sleeve (405) through a flexible coupling provided by the poppet spring (430) so to progressively compress the spring (430), ii) progressively moving the locking sleeve (405) into the locking flexure (410, 415), iii) progressively flexing the locking flexure fingers flexible section (415) while clearing the poppet stop nut (435) past the locking flexure finger free end (410), iv) further progressively moving the locking sleeve (405) and progressively flexing the locking flexure fingers flexible section (415), v) displacing the locking flexure finger free end (410) to a position interfering with the poppet stop nut (435) and therefore locking the poppet (320, 330) from moving back in case of back pressure (e.g. backflow), and vi) stop moving of the nut (365) by stopping rotation of the screw (360) via interaction of the hard stop (345) and the roller screw nut interference (350). It should be noted that when the poppet (320, 330) is closed, the nut (365) and the poppet (320, 330) are not rigidly coupled, but rather coupled through a flexible coupling provided by the compression of the poppet spring (430) created via faces of the poppet stop nut (435) and nut (365) of the roller screw. Also, to be noted that, as later described in relation to FIGS. 7A-7D, a groove on the locking sleeve (405) configured to interact with a notch on the locking flexure finger flexible section (415) acts as a detent to prevent the locking sleeve (405) from being pushed back by the poppet spring (430) and thereby to back-drive the roller screw mechanism (220, 245).

To open the poppet (320, 330), the nut (365) is progressively retracted, which progressively retracts the locking sleeve (405) from the locking flexure (410, 415), which relaxes the fingers flexible section (415) of the locking flexure (710) and thereby moves (via rotation about axial direction of the hinges 720) the locking flexure fingers free ends (410) to a position that clears the poppet stop nut (435) so to unlock the poppet (320, 330). During this time, the poppet (320, 330) is held in place by transported fluid (e.g. oil within the clean enclosure) pressure and the compressed poppet spring (430). Retracting the nut (365) farther, engages the poppet peg (440) that is rigidly connected to the poppet shaft (330) to the nut (365), the nut (365) pulls the poppet (320, 330) away, thereby opening the fluid path. It should be noted that opening of the poppet (320, 330) is provided via a rigid coupling between the poppet (320, 330) and the nut (365), as opposed to the flexible coupling provided when the poppet (320, 330) is in the closed position.

Figure 5:
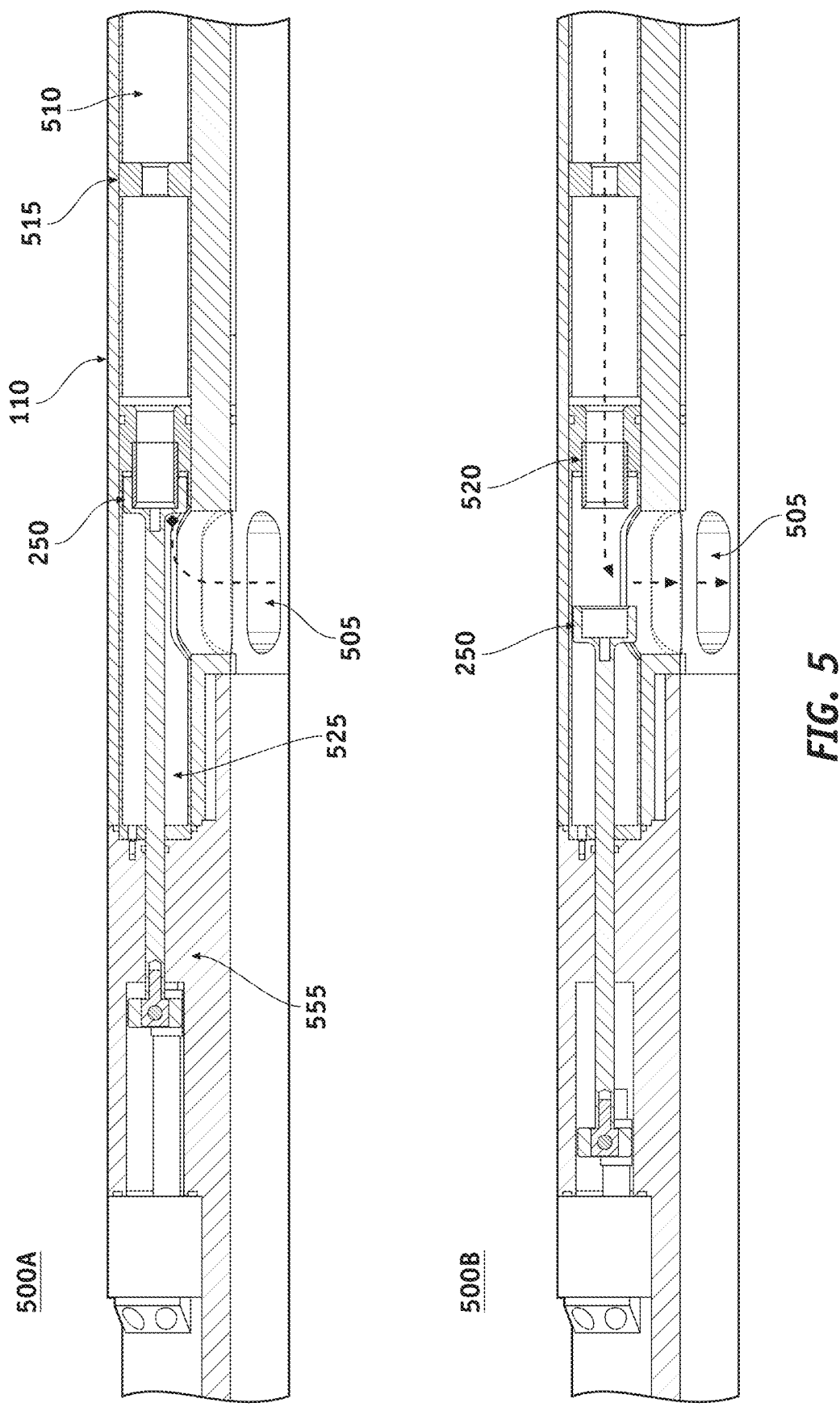
FIG. 5 shows an enlarged version of FIG. 1 in a region of cross section details 500A and 500B. Details 500A depict closing of a flow path (110) by pushing forward a poppet cap (250) to cap an outlet (520) of the flow path (110) and thereby preventing backflow (shown as a dotted curve) into the flow path (110) from an opening (505) into the inner pipe (105). Details 500B depict opening of the flow path (110) by extracting the poppet cap (250) to uncap the outlet (520) of the flow path (110) and thereby allowing flow (shown as dotted curve) from the flow path (110) into the inner piper (105) via an opening (505) into the inner pipe.

FIG. 5 shows an enlarged version of FIG. 1 in a region of cross section details 500A and 500B. Details 500A depict closing of a flow path (110) by pushing forward a poppet (250) to cap an outlet (520) of the flow path (110) and thereby preventing backflow (shown as a dotted curve) into the flow path (110) from an opening (505) into the inner pipe (105). Details 500B depict opening of the flow path (110) by extracting the poppet (250) to uncap the outlet (520) of the flow path (110) and thereby allowing flow (shown as dotted curve) from the flow path (110) into the inner piper (105) via an opening (505) into the inner pipe. Although not shown in the figure, similar actuation and locking mechanism discussed above may be provided to mechanically control position and locking of the poppet (250).

Figure 6:
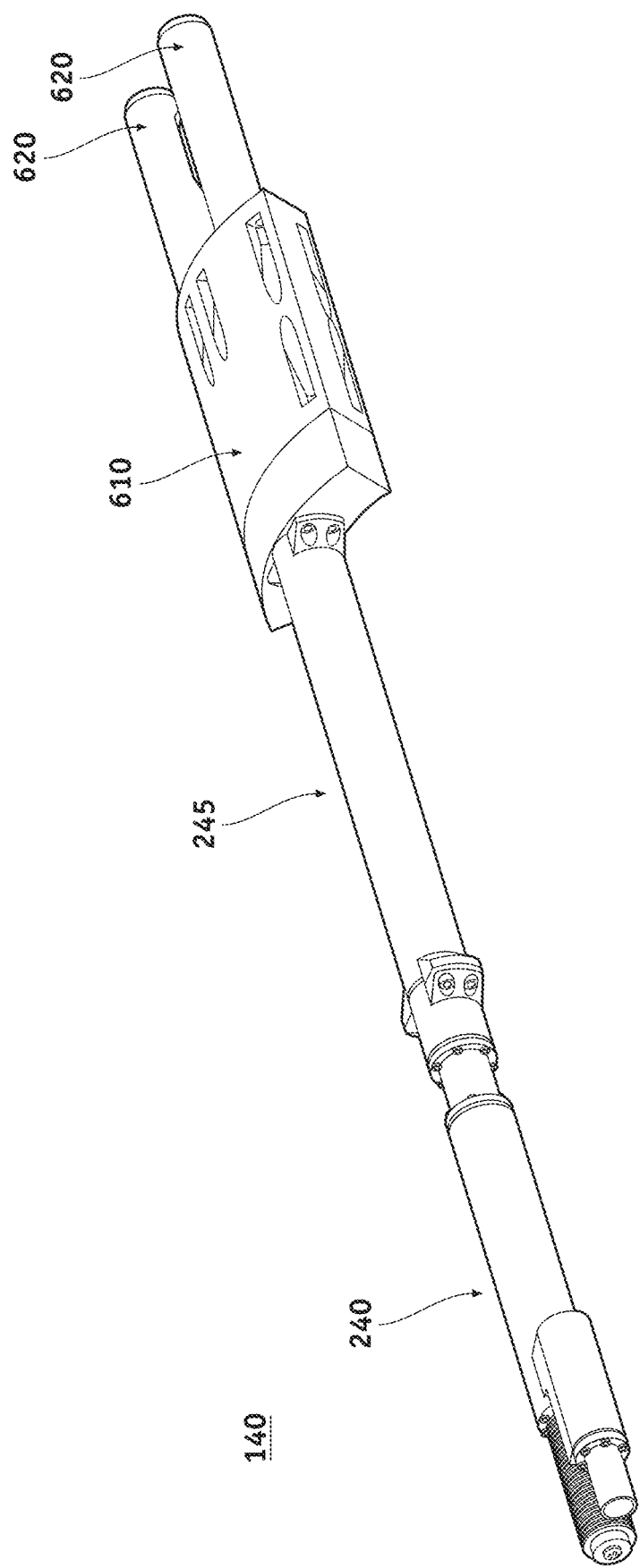
FIG. 6 illustrates more details of the backflow actuator portion (140) of the choke valve (100) depicted in FIG. 1. In particular, a yoke and poppets housing assembly (610) is used to actuate a plurality of poppets (620) with backflow prevention provided by a roller screw and locking mechanism (245) similar to one described in FIGS. 3-4, actuated via a single motor (240).

FIG. 6 illustrates more details of the backflow actuator portion (140) of the choke valve (100) depicted in FIG. 1. In particular, a yoke and poppets housing assembly (610) may be used to actuate a plurality of poppets (620) that operate on outlets of a plurality of corresponding flow paths (110) with backflow prevention provided by a roller screw and locking mechanism (245) similar to one described in FIGS. 3-4, actuated via a single motor (240). In cases where the valve (100) is not expected to be actuated against a high pressure, such single motor mechanism actuating a plurality of poppets may be envisioned. Number of poppets controlled by a single motor may be changed, from a single poppet to more, depending on design goals and constrains.

Figure 7A:
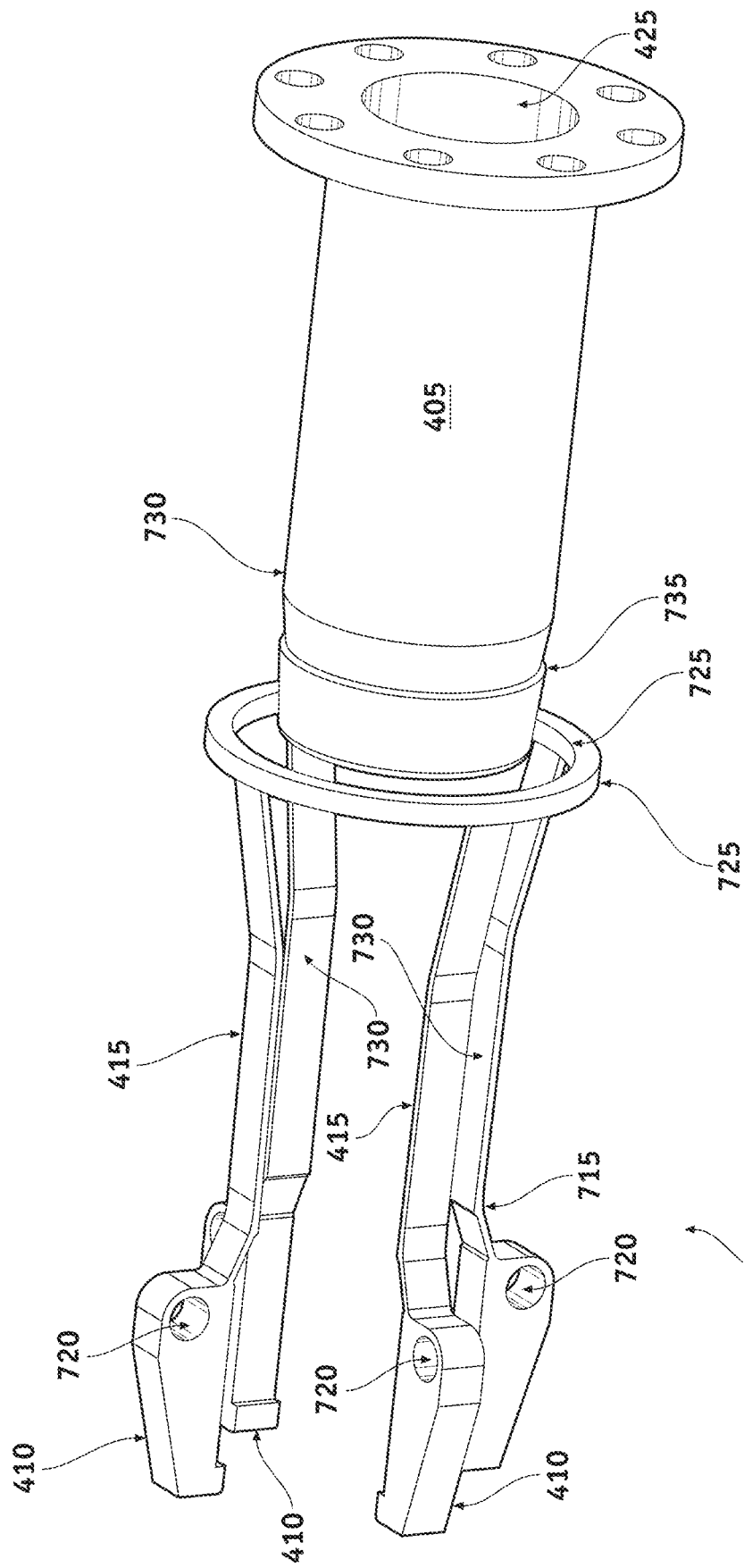
FIG. 7A illustrates details of the locking flexure (710) and the locking sleeve (405) according to an embodiment of the present disclosure. Such details include contact features (730) defined by locking flexure finger flexible section (415) surfaces and corresponding facing surface of the locking sleeve (405). Locking flexure fingers free end (410) comprise hinges (720) modeled as revolute joint using a stiff spring to constrain fingers free end (410) rotation about the hinges (720) axis in a cantilevered fashion. Such rotation of the fingers free end (410) being based on a flexing of the flexure finger flexible section (415) via interaction of the contact features (730). Fingers (410, 415, 720) of the locking flexure (710) are constrained at their base surfaces by a locking flexure base (725) that is configured not to interfere (e.g. make contact with) the contact features (730). The locking sleeve (405) is constrained at its base by a locking sleeve base (425) that is configured to be (rigidly) coupled to the roller screw nut (365) for linear translation of the locking sleeve (405). Further details include a finger notch (715) formed in a region of each finger flexible section (415) close to a corresponding finger hinge (720), and a mating locking sleeve groove (735) formed circumferentially on a surface region of the locking sleeve (405) with further details shown in FIGS. 7B, 7C and 7D.

FIG. 7A illustrates details of the locking flexure (710) and the locking sleeve (405) according to an embodiment of the present disclosure. Such details include contact features (730) defined by locking flexure fingers flexible section (415) surfaces and corresponding facing surface of the locking sleeve (405). Locking flexure fingers free end (410) comprise hinges (720) modeled as revolute joint using a stiff spring to constrain fingers free end (410) rotation about the hinges (720) axis in a cantilevered fashion. Such rotation of the fingers free end (410) being based on a flexing of the flexure fingers flexible section (415) via interaction of the contact features (730). Fingers (410, 415, 715, 720) are constrained at their base surfaces by a locking flexure base (725) that is configured not to interfere (e.g. make contact with) the contact features (730). The locking sleeve (405) is constrained at its base by a locking sleeve base (425) that is configured to be (rigidly) coupled to the roller screw nut (365) for linear translation of the locking sleeve (405). Different perspectives of the details shown in FIG. 7A can be seen in FIG. 7E.

With further reference to FIG. 7A, a finger notch (715) formed in a region of each finger flexible section (415) close to a corresponding finger hinge (720), and a mating locking sleeve groove (735) formed circumferentially on a surface region of the locking sleeve (405), are provided to act as a detent to prevent the locking sleeve (405) from being pushed back by the compressed poppet spring (430) when the poppet is in the closed position, and thereby to back-drive the roller screw mechanism (220, 245). In other words, a force required to overcome the detent is larger than a force created by the compressed poppet spring (430).

Considering a required input force over the entire travel range of the locking sleeve (405), the force peaks during interaction of the contact features (730) of the locking flexure finger flexible section (415) with the locking sleeve (405), reaching a higher value when the locking sleeve (405) is withdrawn from the fully forward position (FIG. 3, detail 300A) at the detent location.

Figure 7C:
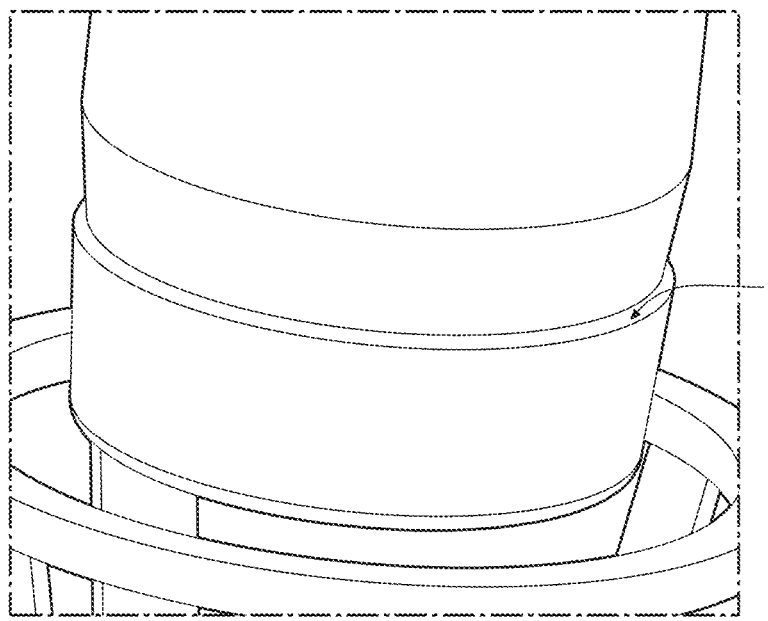
FIG. 7C shows an enlarged version of FIG. 7A in a region of the locking sleeve groove (735).
Figure 7B:
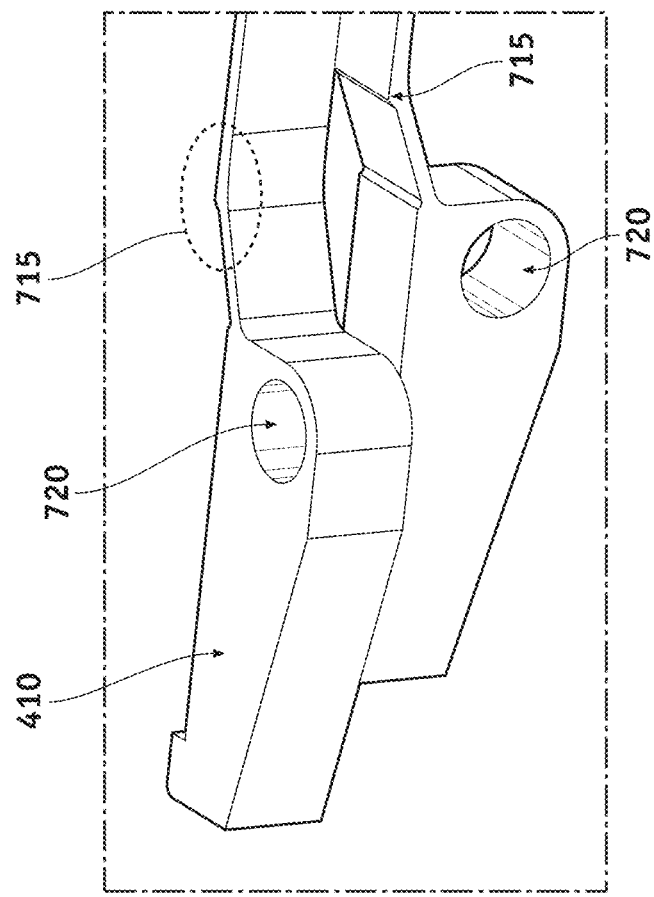
FIG. 7B shows an enlarged version of FIG. 7A in a region of the finger notch (715).
Figure 7D:
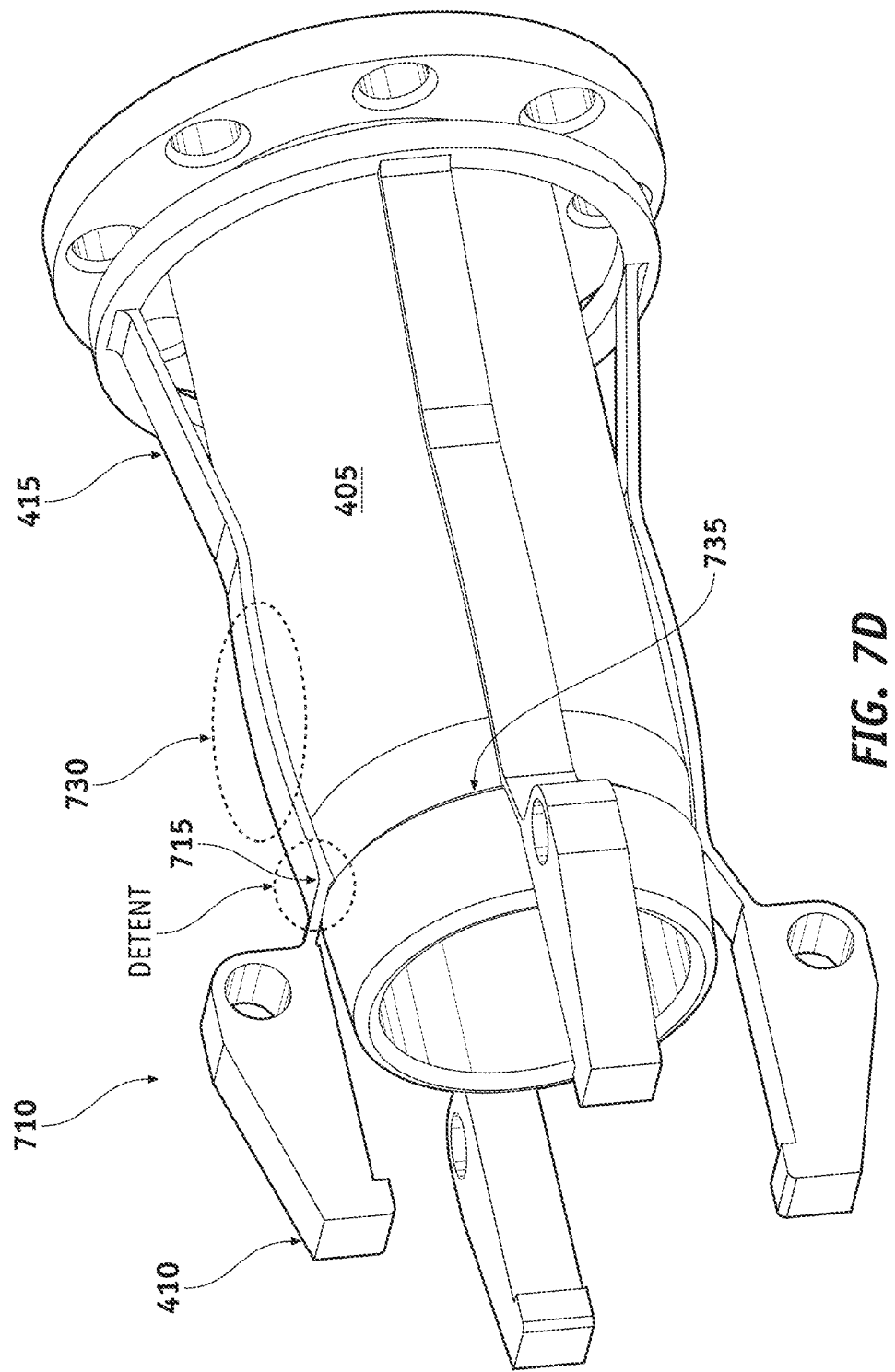
FIG. 7D illustrates details of the locking sleeve (405) fully inserted inside the locking flexure (710) so that the finger notch (715) formed in each of the fingers flexible section (415) and the locking sleeve groove (735) are engaged.
Figure 7E:
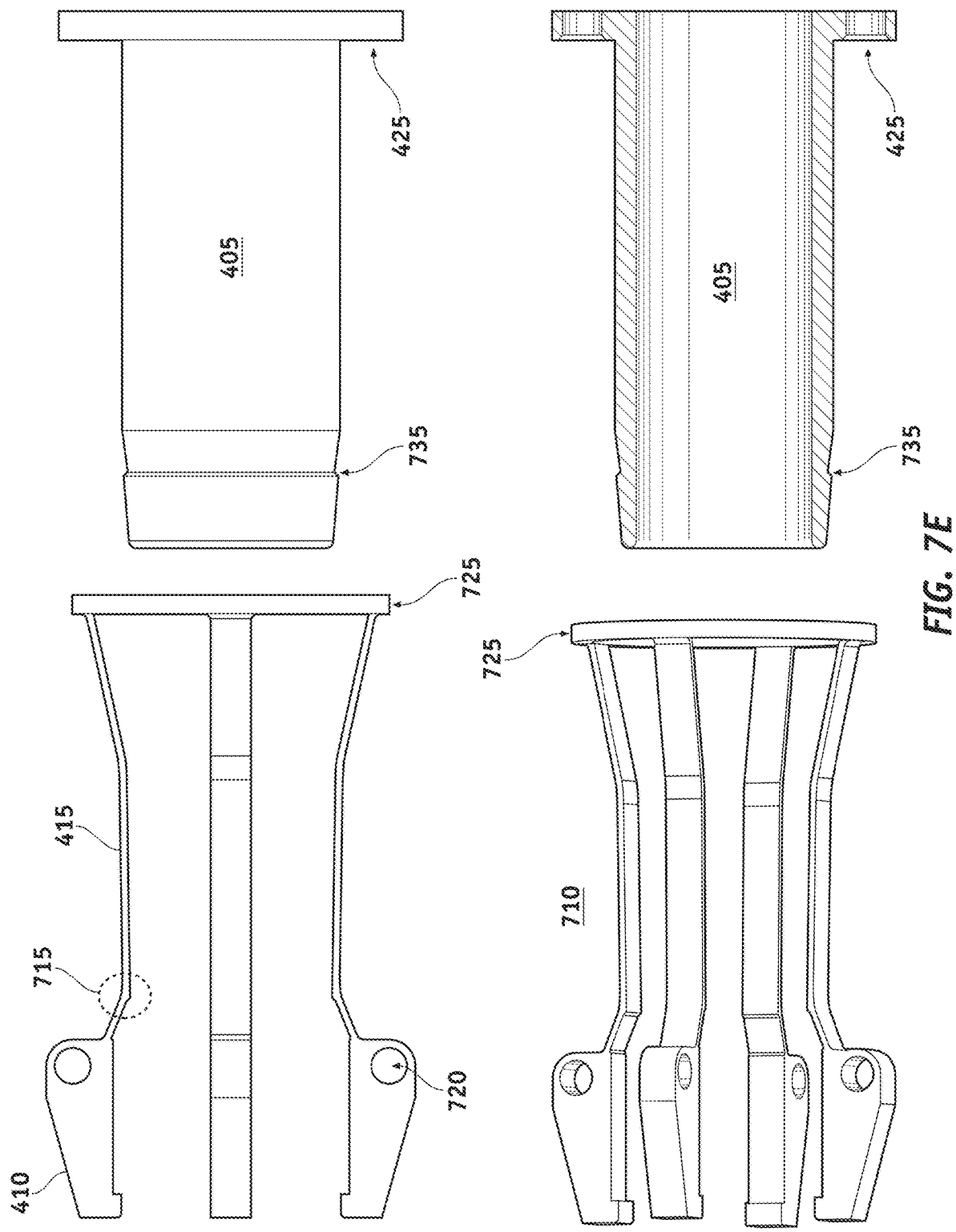
FIG. 7E illustrates details of the flexure (710) and the locking sleeve (405) depicted in FIG. 7A from different perspectives.

Further details of the finger notch (715) and the locking sleeve groove (735) can be seen in FIG. 7B and FIG. 7C respectively, while engaging of the detent created via interaction of the finger notch (715) and the locking sleeve groove (735) can be seen in FIG. 7D. As can be seen in FIG. 7D, when the locking sleeve (405) is fully inserted within the locking flexure (710), the finger notch (715) and the locking sleeve groove (735) engage to create the detent. At the same time, the contact features (730) created by surfaces of the locking flexure fingers flexible section (415) and of the locking sleeve (405) are engaged so that the locking flexure fingers flexible section (415) are flexed, thereby displacing the locking flexure fingers free end (410) to a position that can block the poppet stop nut (435).

Figure 7F:
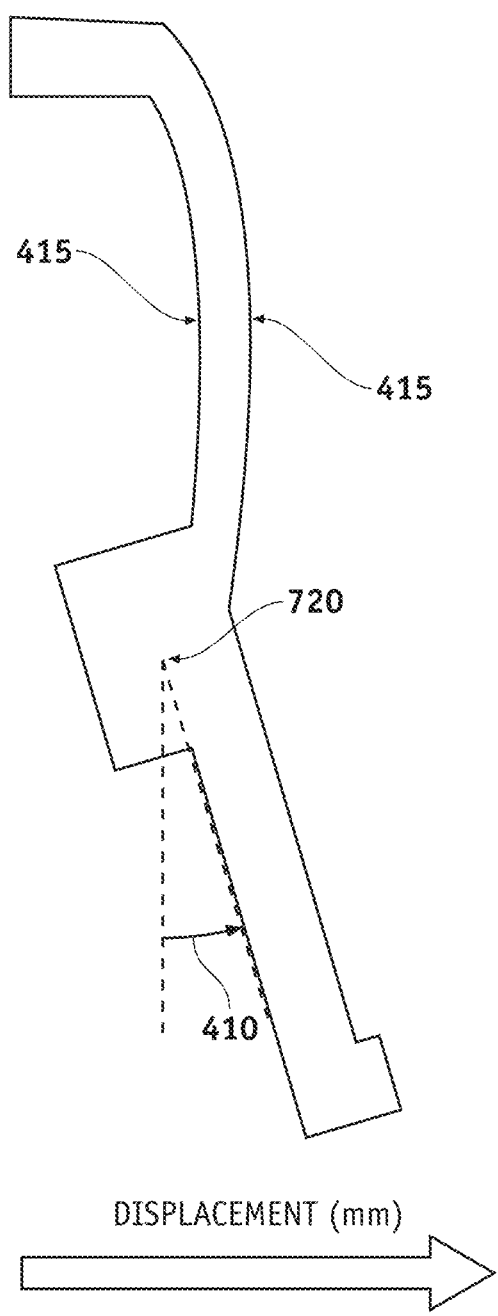
FIG. 7F shows simulation results of a displacement of a finger free end (410) of the locking flexure (710) according to the present disclosure as a function of a displacement of the locking flexure finger flexible section (415). As noted above, the displacement of the locking flexure finger flexible section (415) may be responsive to insertion of the locking sleeve (405) into the locking flexure (710) which flexes the finger flexible section via interaction of the contact features (730).
Figure 7G:
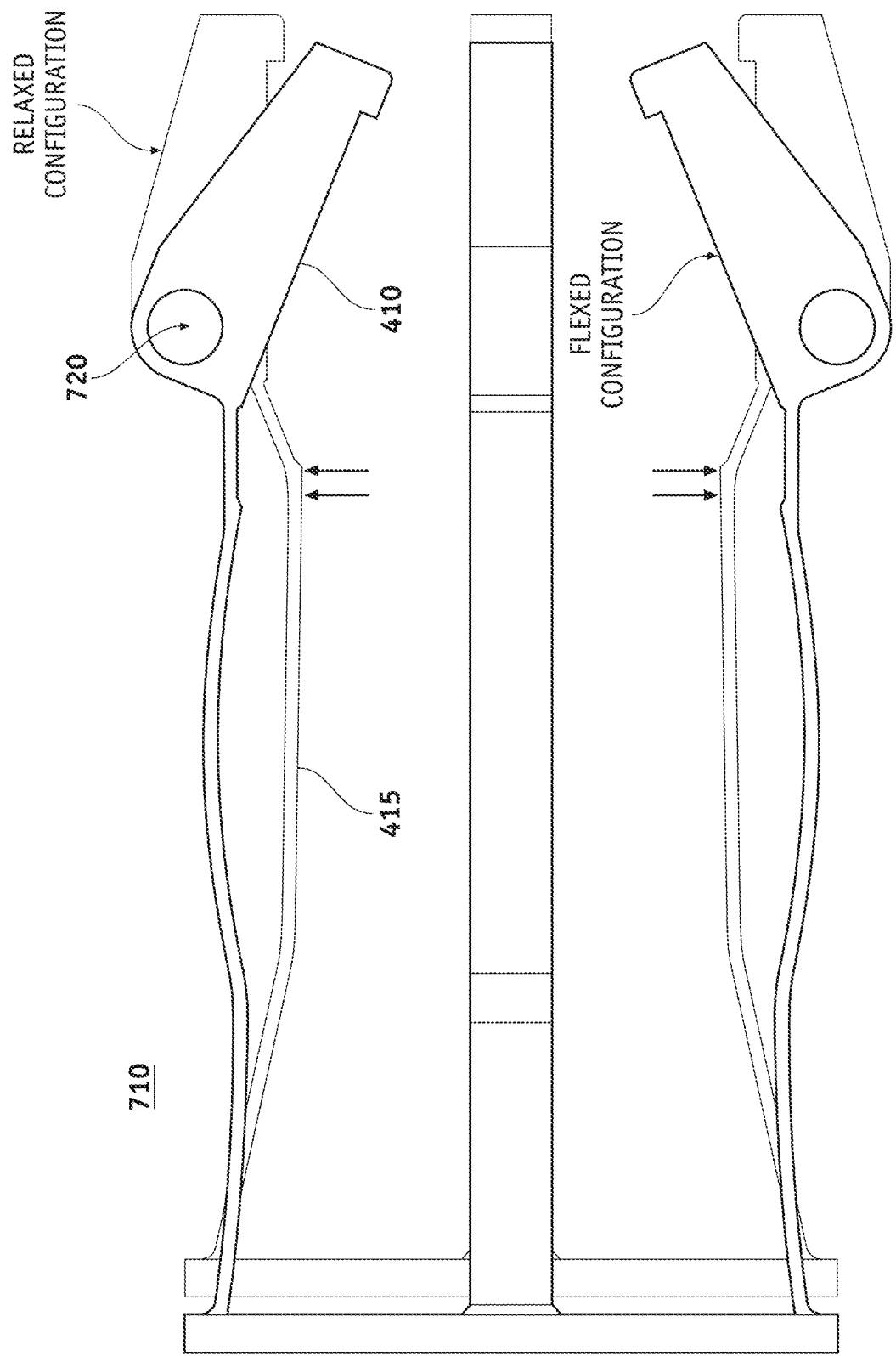
FIG. 7G shows the locking flexure (710) in a relaxed configuration where the fingers flexible sections (415) are not flexed and as a result the fingers free ends (410) are at rest (not rotated), and in a flexed configuration where the fingers flexible sections (415) are flexed and as a result the fingers free ends (410) are rotated.

FIG. 7F shows simulation results of a displacement of a finger (410) of the locking flexure (710) according to the present disclosure as a function of a displacement of the locking flexure finger flexible section (415). As noted above, the displacement of the locking flexure finger flexible section (415) may be responsive to insertion of the locking sleeve (405) into the locking flexure (710) which flexes the finger flexible section (415) via interaction of the contact features (730) as shown, for example, in FIG. 7D. Displacement of the finger (410, 415) in the solid configuration corresponds to a fully flexed finger flexible section (415) obtained when the detent is engaged (e.g. FIG. 7D), while displacement of the finger (410, 415) in the dotted configuration corresponds to the finger flexible section (415) in a rest position (not flexed) obtained when the contact features (730) are not engaged (e.g. locking sleeve retracted). FIG. 7G shows the locking flexure (710) in a relaxed configuration where the fingers flexible sections (415) are not flexed and in a flexed configuration where the fingers flexible sections (415) are flexed. As can be seen in FIG. 7G, in the relaxed configuration the fingers free ends (410) are at rest (not rotated), and in a flexed configuration the fingers free ends (410) are rotated around an axis of the hinges (720).

According to the exemplary embodiments of the present disclosure described above, a valve that allows the control of each flow path using one actuator is presented. It transforms the rotary motion of the motor into linear motion using a roller screw mechanism. The travel of the roller screw nut is predefined between a front and back hard stops by preventing the roller screw from rotating when these positions are reached. Blocking the screw and not the nut prevents the nut-screw locking when the nut is driven against a rigid stop. The poppet is attached to the roller screw nut using a flexible connection where a spring is compressed. The roller screw nut also drives a sleeve that moves relatively to a flexure. On the sleeve, there are inclined surfaces and a groove. When the sleeve is driven by the roller screw nut toward closing the valve, the sleeve deforms the flexure fingers causing the cantilever end of each finger to move radially and prevent the poppet from being pushed back. If the sleeve is moved farther in the direction of valve closing, the sleeve groove engages the fingers notches and this prevents the poppet spring to push the sleeve back, back drive the roller screw and allow the poppet to get unlocked.

Keeping the poppet locked in the closed position the backflow thru the flow path is prevented. Another method of preventing the backflow is using a backflow prevention mechanisms which drives a series of poppets using one linear actuator to close the end of the respective flow paths. This mechanism can be implemented in three configurations: using an actively controlled poppet, a passive spring driven poppet, or a combination of the two.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A flow control valve comprising:
one or more flow paths;
one or more poppets configured to operate in one of a fully open state and a fully closed state to control flow of fluid through the one or more flow paths; and
a backflow prevention mechanism comprising:
a linear actuator configured to control operating states of the one or more poppets through motion of the one or more poppets according to an axial direction; and
a locking mechanism configured to lock the one or more poppets in the fully closed state and maintain the one or more poppets in their closed state against a back pressure of the backflow in the one or more flow paths, wherein the locking mechanism comprises:
a locking sleeve rigidly coupled to the linear actuator; and
a locking flexure configured to flex responsive to a surface interaction with the locking sleeve,
wherein in the fully closed state, the locking sleeve is fully inserted within the locking flexure and a resulting surface interaction causes a flexing of the locking flexure to create a mechanical interference against movement of the one or more poppets in the axial direction, and wherein retraction of the locking sleeve from a fully inserted position progressively reduces the flexing of the locking flexure to clear the mechanical interference.

2. The flow control valve of claim 1, wherein the linear actuator comprises a roller screw mechanism comprising:
a screw that is constrained from movement in the axial direction; and a nut that is constrained from rotation around the axial direction,
wherein a rotation of the screw around the axial direction causes the nut to move in the axial direction.

3. The flow control valve according to claim 2, wherein a linear travel range of the nut is delimited by a first hard stop and a second hard stop rigidly coupled to the nut at respective first and second positions.

4. The flow control valve according to claim 3, wherein the linear actuator further comprises an additional mechanical interference mounted on the screw, the additional mechanical interference configured to limit rotation of the screw by way of mechanical interaction with one of the first hard stop and the second hard stop.

5. The flow control valve according to claim 4, wherein:
in the fully open state, the additional mechanical interface interacts with the first hard stop, and
in the fully closed state, the additional mechanical interface interacts with the second hard stop.

6. The flow control valve according to claim 2, wherein the locking sleeve is rigidly coupled to the nut.

7. The flow control valve according to claim 6, wherein in the fully closed state, a coupling between the nut and a poppet of the one or more poppets is provided via compression of a spring.

8. The flow control valve according to claim 7, wherein the spring is compressed between a face of the nut and a poppet stop nut rigidly connected to the poppet.

9. The flow control valve according to claim 7, wherein the fully open state is provided by way of a rigid coupling between the nut and the poppet.

10. The flow control valve according to claim 1, wherein:
the locking sleeve comprises a substantially cylindrical contact surface in the axial direction,
the locking flexure comprises a plurality of fingers, each comprising a finger flexible section and a finger free end, and
in the fully closed state, surface interaction between the cylindrical contact surface and the finger flexible section of each finger causes a displacement of the finger free end to create the mechanical interference against movement of the one or more poppets.

11. The flow control valve according to claim 10, wherein the displacement of the finger free end is in correspondence of a rotation of the finger free end about an axis of a hinge formed in a region of the finger free end closer to the finger flexible portion.

12. The flow control valve according to claim 10, wherein in the fully closed state,
a coupling between the locking sleeve and a poppet of the one or more poppets is provided via compression of a spring, and
the surface interaction between the cylindrical contact surface and the finger flexible section creates a detent that prevents the locking sleeve from being pushed back by the compression.

13. The flow control valve according to claim 12, wherein the detent is created by interaction of a groove formed on the locking sleeve and a notch formed on the finger flexible section of each finger.

14. The flow control valve according to claim 1, wherein the linear actuator is actuated via a single motor, and controls operating states of a single flow path.

15. The flow control valve according to claim 1, wherein the linear actuator is actuated via a single motor, and controls operating states of a plurality of flow paths.

16. The flow control valve according to claim 1, wherein the backflow prevention mechanism is coupled to one or more of: a) inlets of the one or more flow paths, and b) outlets of the one or more flow paths.

17. A locking mechanism comprising:
a locking sleeve comprising a substantially cylindrical contact surface that is constrained at a base by a locking sleeve base, the cylindrical contact surface defining an axial direction; and
a locking flexure comprising:
a locking flexure base of a substantially circular shape with a hollow body configured to clear the cylindrical contact surface of the locking sleeve; and
a plurality of locking flexure fingers constrained at their base by the locking flexure base, each of the plurality of the locking flexure fingers comprising:
i) a finger flexible section having flexible contact surfaces configured to interact with the cylindrical contact surface; and
ii) a finger free end formed at a distal end of the each finger from the locking flexure base, the finger free end comprising a hinge to constrain rotation of the finger free end about an axis of the hinge that is substantially perpendicular to the axial direction of the cylindrical contact surface;
wherein for each of the locking flexure fingers, interaction of the contact surfaces provided by:
a progressive insertion of the locking sleeve into the locking flexure while the locking flexure is in a relaxed configuration, thereby progressively flexing the finger flexible section to cause progressive rotation of the finger free end about the axis of the hinge to put the locking flexure in a flexed configuration wherein the finger free end is rotated, and
a progressive retraction of the locking sleeve from the locking flexure while in the flexed configuration, thereby progressively relaxing the finger flexible section to cause progressive rotation of the finger free end about the axis of the hinge to put the locking flexure in the relaxed configuration wherein the finger free end is at rest.

18. The locking mechanism according to claim 17, wherein the locking mechanism comprises a detent that is engaged when the locking sleeve is fully inserted within the locking flexure, the detent being formed by interaction of:
a groove formed at a distal end, opposite the locking sleeve base, of the substantially cylindrical contact surface of the locking sleeve; and
a notch formed in the finger flexible section of each of the plurality of the locking flexure fingers.

19. A method for backflow prevention in a valve comprising one or more flow paths, the method comprising:
providing one or more poppets to control fluid flow of the one or more flow paths, the one or more poppets configured to operate according to operating states comprising a fully open state and a fully closed state; and
controlling, through a linear actuator, the operating states of the one or more poppets through motion of the one or more poppets according to an axial direction; wherein controlling for closing of the one or more poppets comprises:
i) progressively moving a locking sleeve rigidly coupled to the linear actuator into a locking flexure;
ii) based on the progressively moving, progressively compressing a spring coupled between the one or more poppets and the linear actuator, thereby moving said poppets;
iii) based on the progressively moving, creating a surface interaction between the locking sleeve and the locking flexure;
iv) based on the creating, flexing the locking flexure while clearing a stop nut rigidly coupled to the one or more poppets;
v) repeating steps i) through iii); and
vi) based on the repeating, reaching the fully closed state and further flexing the locking flexure to create an interference between the locking flexure and the stop nut, thereby locking the one or more poppets.

20. The method according to claim 19, wherein the reaching of the fully closed state comprises engaging a detent created by the surface interaction between the locking sleeve and the locking flexure that prevents the locking sleeve from being pushed back by a compression force of the spring.

21. The method according to claim 19, wherein controlling for opening of the one or more poppets comprises:
i) progressively retracting the locking sleeve from the locking flexure;
ii) based on the progressively retracting, progressively relaxing the locking flexure;
iii) based on the progressively relaxing, clearing the stop nut and moving the locking sleeve away from the locking flexure to clear the surface interaction between the locking sleeve and the locking flexure;
iv) further progressively retracting the locking sleeve;
v) based on the further progressively retracting the sleeve, rigidly coupling the one or more poppets and the linear actuator; and
vi) based on the rigidly coupling, moving the one or more poppets to reach the fully open state.

* * * * *